(12) United States Patent
Sato et al.

(10) Patent No.: US 10,679,792 B2
(45) Date of Patent: Jun. 9, 2020

(54) FILM CAPACITOR

(71) Applicant: Panasonic Intellectual Property Management Co., Ltd., Osaka (JP)

(72) Inventors: Shinya Sato, Toyama (JP); Hirotaka Hisamura, Toyama (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 165 days.

(21) Appl. No.: 15/952,288

(22) Filed: Apr. 13, 2018

(65) Prior Publication Data

US 2018/0233285 A1 Aug. 16, 2018

Related U.S. Application Data

(63) Continuation of application No. PCT/JP2016/004766, filed on Oct. 31, 2016.

(30) Foreign Application Priority Data

Nov. 10, 2015 (JP) ................................ 2015-220539

(51) Int. Cl.
*H01G 4/228* (2006.01)
*H01G 2/10* (2006.01)
(Continued)

(52) U.S. Cl.
CPC .............. *H01G 4/228* (2013.01); *H01G 2/04* (2013.01); *H01G 2/10* (2013.01); *H01G 2/106* (2013.01);
(Continued)

(58) Field of Classification Search
CPC ............ H01G 2/04; H01G 2/10; H01G 2/106; H01G 4/228; H01G 4/18; H01G 4/38
See application file for complete search history.

(56) References Cited

U.S. PATENT DOCUMENTS

2017/0207027 A1* 7/2017 Sato ..................... H01G 2/04

FOREIGN PATENT DOCUMENTS

JP 60-073297 U 5/1985
JP 2006100507 A * 4/2006
(Continued)

OTHER PUBLICATIONS

International Search Report of PCT application No. PCT/JP2016/004766 dated Jan. 17, 2017.
(Continued)

*Primary Examiner* — Eric W Thomas
(74) *Attorney, Agent, or Firm* — McDermott Will & Emery LLP

(57) ABSTRACT

A film capacitor includes a capacitor element, a first bus bar and a second bus bar, a case, and a filling resin. The first bus bar has a first overlapping part, and the second bus bar has a second overlapping part. The first overlapping part and the second overlapping part overlap with each other via an insulating plate. The insulating plate has a first surface that faces the first overlapping part and a second surface that faces the second overlapping part, and has a first protrusion formed on the first surface and a second protrusion formed on the second surface, the second protrusion opposing the first protrusion. The first overlapping part has a first fitting hole into which the first protrusion is fitted, and the second overlapping part has a second fitting hole into which the second protrusion is fitted. The insulating plate has a through-hole that penetrates through the first protrusion and the second protrusion.

4 Claims, 8 Drawing Sheets

(51) Int. Cl.
      *H01G 2/04*          (2006.01)
      *H01G 4/18*          (2006.01)
      *H01G 4/224*        (2006.01)
      *H01G 4/38*          (2006.01)

(52) U.S. Cl.
      CPC ............... *H01G 4/18* (2013.01); *H01G 4/224* (2013.01); *H01G 4/38* (2013.01)

(56) References Cited

FOREIGN PATENT DOCUMENTS

| JP | 2006-319027 | | 11/2006 | | |
| JP | 2010-251400 | | 11/2010 | | |
| JP | 5391797 | B2 | 1/2014 | | |
| JP | 2015095627 | A * | 5/2015 | | |
| JP | 2015-103777 | | 6/2015 | | |
| JP | 2015103777 | A * | 6/2015 | ............... | H01G 4/18 |

OTHER PUBLICATIONS

English Translation of Chinese Search Report dated Jun. 3, 2019 for the related Chinese Patent Application No. 201680064650.X.

\* cited by examiner

FILM CAPACITOR

RELATED APPLICATIONS

This application is a continuation of the PCT International Application No. PCT/JP2016/004766 filed on Oct. 31, 2016, which claims the benefit of foreign priority of Japanese patent application No. 2015-220539 filed on Nov. 10, 2015, the contents all of which are incorporated herein by reference.

BACKGROUND

1. Technical Field

The present disclosure relates to a film capacitor.

2. Description of the Related Art

Unexamined Japanese Patent Publication No. 2015-103777 describes a metallized film capacitor in which a plurality of capacitor elements is housed in a case having an opened upper face and the case is filled with a filling resin. Each of the capacitor elements has metallikon electrodes (end-face electrodes) formed on both end surfaces and an external extracting terminal (a bus bar) connected to each of the metallikon electrodes.

In the metallized film capacitor in Unexamined Japanese Patent Publication No. 2015-103777, the two external extracting terminals are overlapped with an insulating sheet (an insulating plate) in between to reduce equivalent series inductance (ESL) serving as an inductance component of the bus bars. Each portion where the two external extracting terminals are overlapped has a plate shape extending in a horizontal direction and is embedded in the filling resin except a tip of the portion.

SUMMARY

A film capacitor according to an aspect of the present disclosure includes a capacitor element, a first bus bar and a second bus bar, a case, and a filling resin. The first bus bar and the second bus bar are configured to extract electricity from the capacitor element. The capacitor element, the first bus bar, and the second bus bar are housed in the case. The case is filled with the filling resin. The first bus bar has a first overlapping part, and the second bus bar has a second overlapping part. The first overlapping part and the second overlapping part overlap with each other via an insulating plate. The insulating plate has a first surface that faces the first overlapping part and a second surface that faces the second overlapping part, and has a first protrusion formed on the first surface and a second protrusion formed on the second surface that faces, the second protrusion opposing the first protrusion. The first overlapping part has a first fitting hole into which the first protrusion is fitted, and the second overlapping part has a second fitting hole into which the second protrusion is fitted. The insulating plate has a through-hole that penetrates through the first protrusion and the second protrusion.

According to the present disclosure, position deviation between a bus bar and an insulating plate can be prevented, and a case can be favorably filled with a resin.

Effects or meanings of the present disclosure will be further clarified in the following description of the exemplary embodiment. However, the exemplary embodiment described below is merely an example of implementing the present disclosure, and the present disclosure is not at all limited to the example described in the following exemplary embodiment.

DETAILED DESCRIPTION OF EMBODIMENT

In the metallized film capacitor in Unexamined Japanese Patent Publication No. 2015-103777, the insulating sheet and the two external extracting terminals are not mutually fixed. Accordingly, the external extracting terminal may be deformed by an external impact, or the insulating sheet may be moved by being pushed by a flow of the filling resin flowing into the case. Consequently, position deviation is likely to occur between the external extracting terminal and the insulating sheet. As a result, there is a possibility that a creepage distance between the two external extracting terminals cannot be sufficiently secured.

Further, in the metallized film capacitor in Unexamined Japanese Patent Publication No. 2015-103777, when the case is filled with the filling resin, it is also likely that the filling resin will not smoothly flow into a region below a portion where the two external extracting terminals overlap.

In consideration of the above-described problems, the present disclosure provides a film capacitor which can suppress position deviation between a bus bar and an insulating plate, and can smoothly fill a case with a resin.

An exemplary embodiment of the present disclosure will be described with reference to the accompanying drawings. For the sake of convenience, directions including a front to rear direction, a left to right direction, and an up to down direction are added to some of the drawings as appropriate.

Figure 1A:
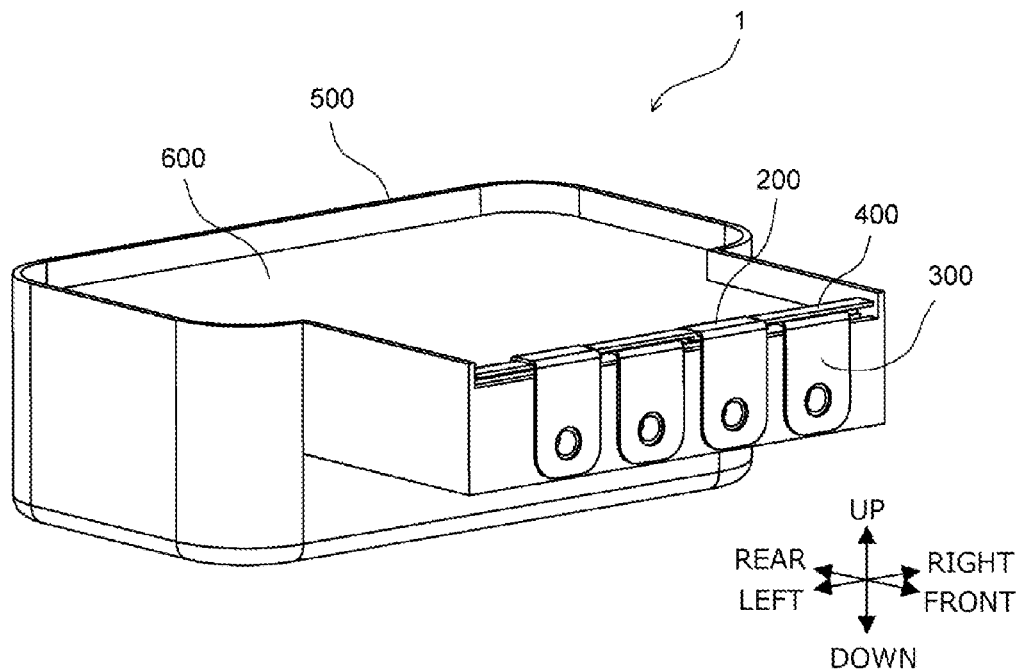
FIG. 1A is a front perspective view illustrating a film capacitor according to an exemplary embodiment.
Figure 1B:
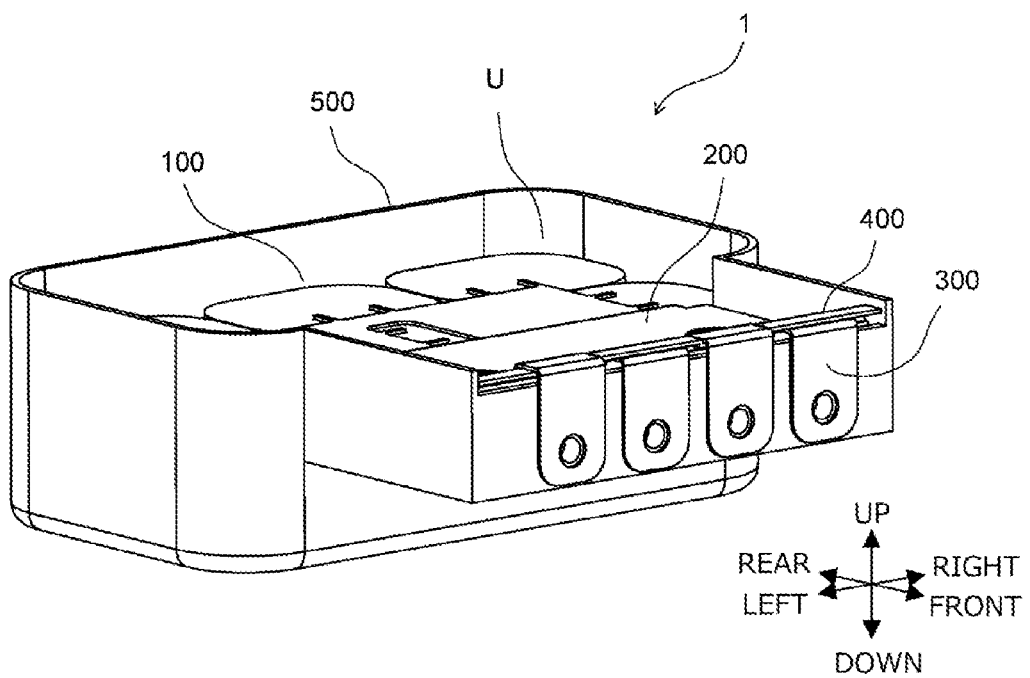
FIG. 1B is a front perspective view illustrating the film capacitor which is not filled with a filling resin according to the exemplary embodiment.
Figure 2:
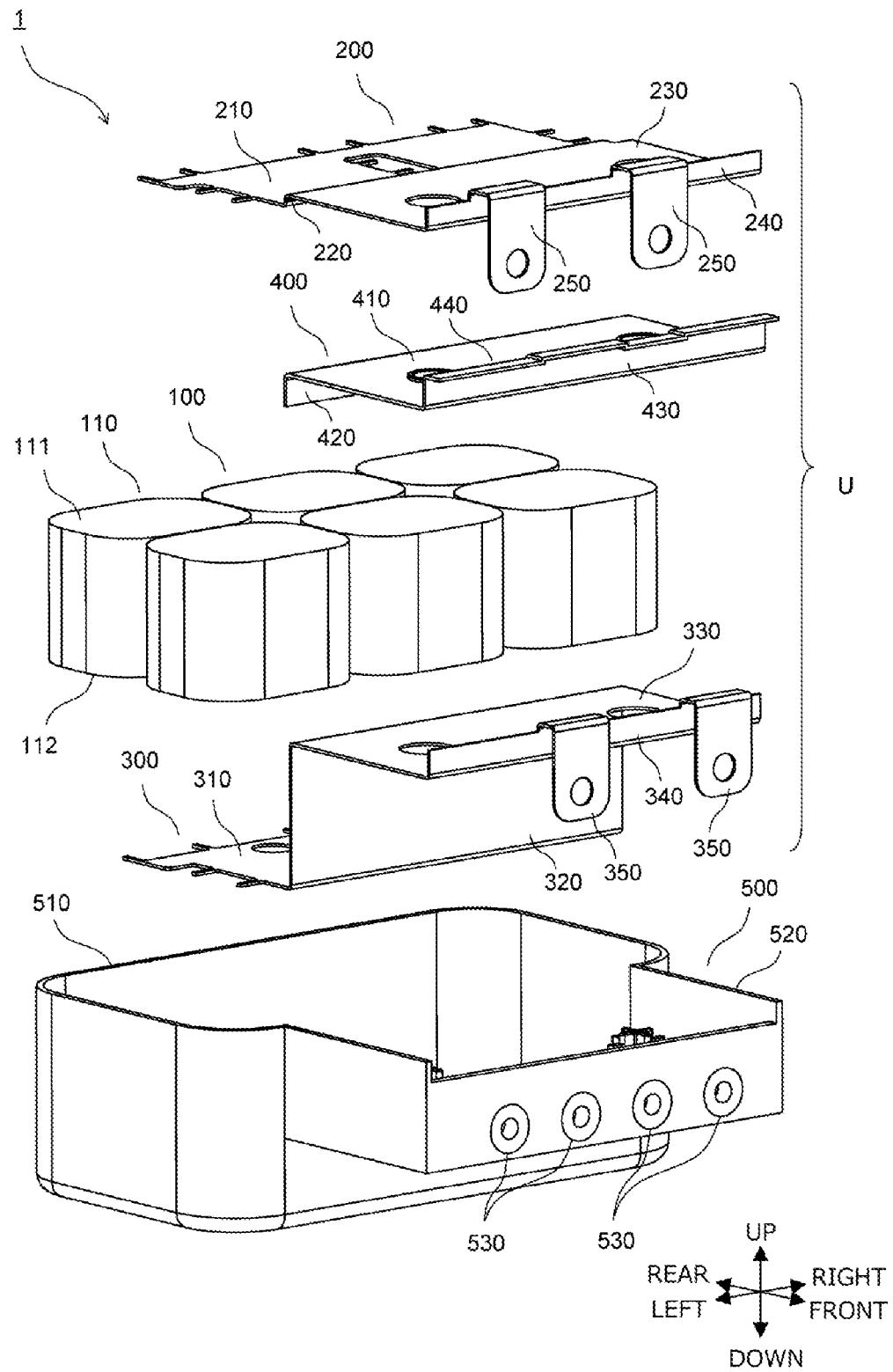
FIG. 2 is an exploded perspective view illustrating the film capacitor according to the exemplary embodiment.

FIG. 1A is a front perspective view illustrating film capacitor 1, and FIG. 1B is a front perspective view illustrating film capacitor 1 that is not filled with filling resin 600. FIG. 2 is an exploded perspective view illustrating film capacitor 1.

As illustrated in FIGS. 1A, 1B, and 2, film capacitor 1 includes capacitor group 100, upper bus bar 200, lower bus bar 300, insulating plate 400, case 500, and filling resin 600. Capacitor group 100, upper bus bar 200, lower bus bar 300, and insulating plate 400 are assembled to constitute capacitor unit U.

Capacitor group 100 includes a plurality of capacitor elements 110 arranged in front to rear direction and left to right direction. In the present exemplary embodiment, capacitor group 100 includes a total of six capacitor elements 110 arranged in two in the front to rear direction and three in the left to right direction. Each of capacitor elements 110 is formed as follows: stacking two metalized films that are dielectric films on which aluminum is deposited; winding or layering the stacked metalized films; and pressing the wound or layered body to make the body flat. End-face electrodes 111, 112 are formed on respective end surfaces of each of capacitor elements 110. Capacitor elements 110 are arranged such that the respective end surfaces are directed in up to down direction. Note that although each of capacitor elements 110 of the present exemplary embodiment is formed of metalized films that are dielectric films on which aluminum is deposited, capacitor element 110 may be formed of metalized films having different metal such as zinc or magnesium deposited on the films. Alternatively, each of capacitor elements 110 may be formed of metalized films having some of the above-described metals disposed on the films or may be formed of metalized films having an alloy of the above-described metals disposed on the films.

Figure 3A:
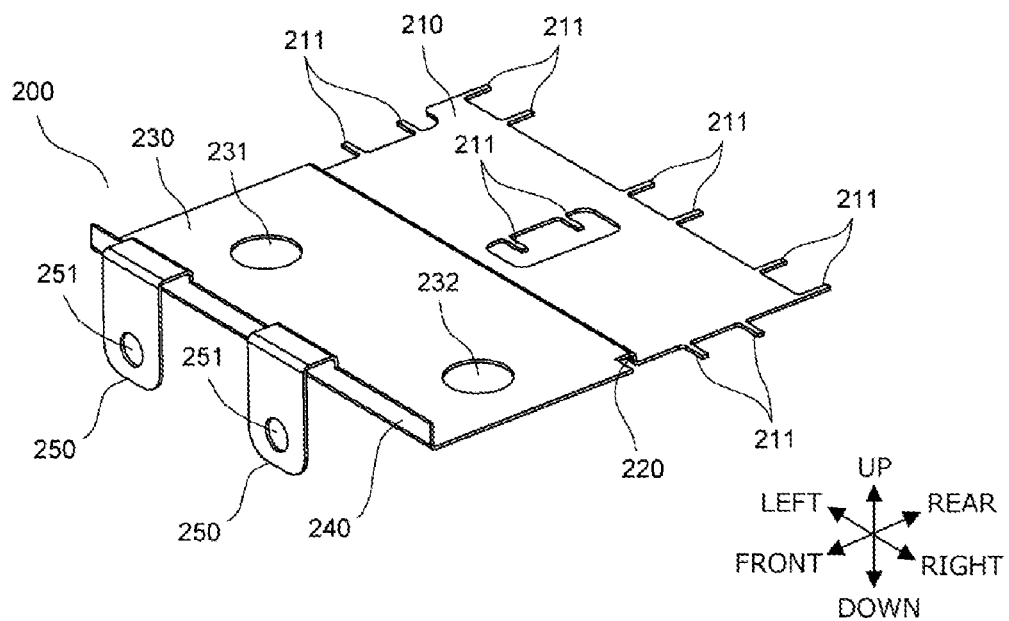
FIG. 3A is a front perspective view illustrating an upper bus bar according to the exemplary embodiment.
Figure 3B:
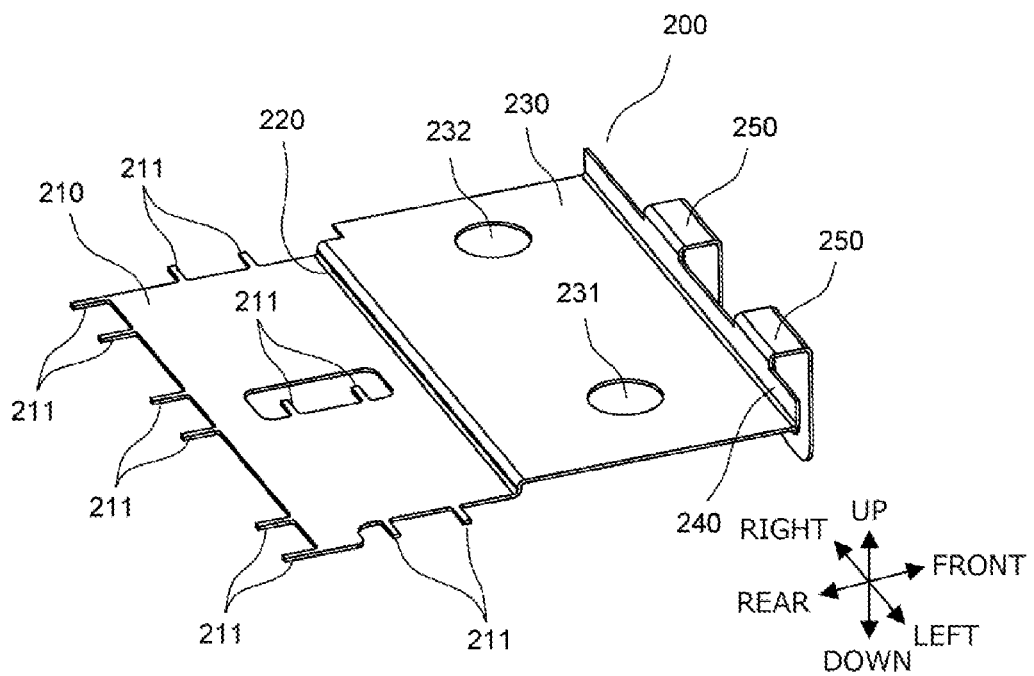
FIG. 3B is a rear perspective view illustrating the upper bus bar according to the exemplary embodiment.
Figure 4A:
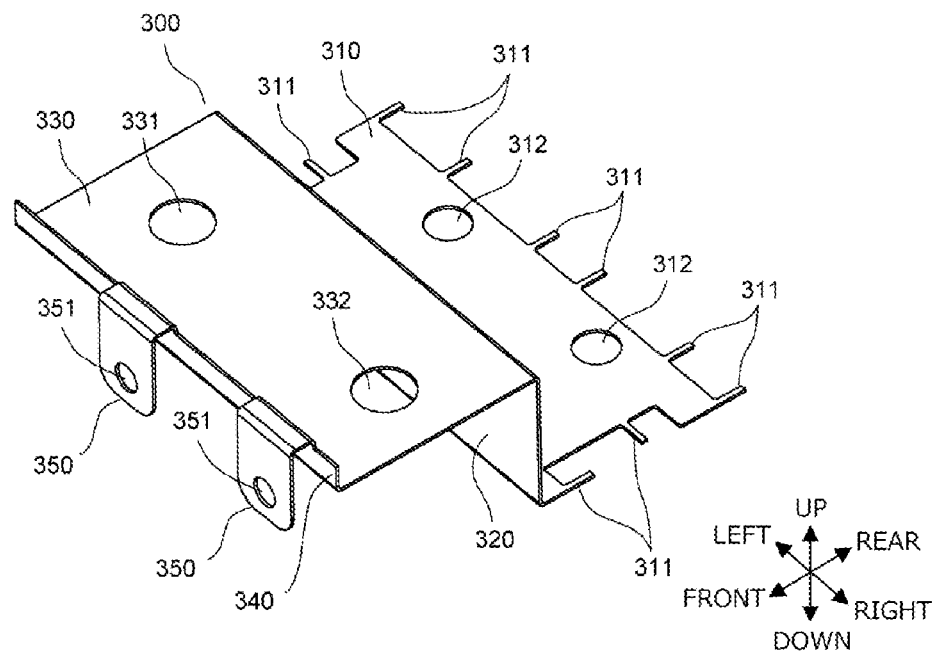
FIG. 4A is a front perspective view illustrating a lower bus bar according to the exemplary embodiment.
Figure 4B:
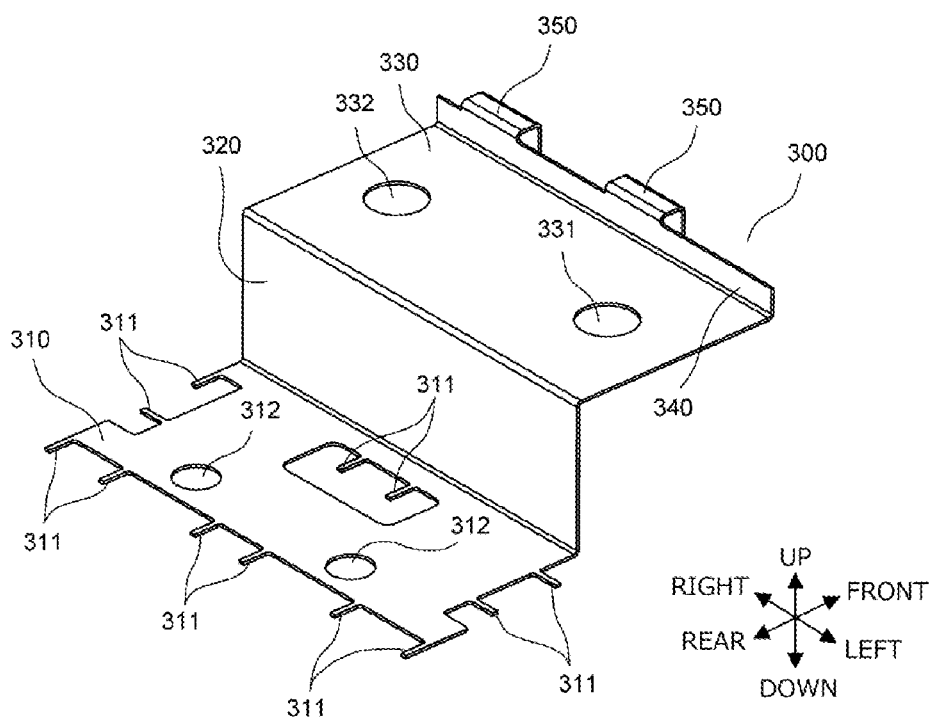
FIG. 4B is a rear perspective view illustrating the lower bus bar according to the exemplary embodiment.

FIG. 3A is a front perspective view illustrating upper bus bar 200, and FIG. 3B is a rear perspective view illustrating upper bus bar 200. FIG. 4A is a front perspective view illustrating lower bus bar 300, and FIG. 4B is a rear perspective view illustrating lower bus bar 300.

Upper bus bar 200 and lower bus bar 300 extract electricity from capacitor group 100. Upper bus bar 200 is connected to end-face electrode 111 on an upper side of each of capacitor elements 110, and lower bus bar 300 is connected to end-face electrode 112 on a lower side of each of capacitor elements 110.

As illustrated in FIGS. 3A and 3B, upper bus bar 200 is formed by a plate made of an electrically conductive material such as a copper plate, and includes first plate 210, second plate 220, third plate 230, fourth plate 240, and two connection terminals 250. Upper bus bar 200 is formed, for example, by appropriately cutting out and bending one copper plate. These first plate 210, second plate 220, third plate 230, fourth plate 240, and two connection terminals 250 are integrated.

First plate 210 has a horizontally long rectangular shape, covers end-face electrode 111 on the upper side of each of capacitor elements 110, and comes into contact with each of end-face electrodes 111. First plate 210 has a pair of electrode terminals 211 formed at a position corresponding to end-face electrode 111 of each of capacitor elements 110. Second plate 220 extends upward from a front end of first plate 210 and has a horizontally long and narrow rectangular shape.

Third plate 230 extends forward from an upper end of second plate 220 and has a horizontally long rectangular shape. Third plate 230 has circular first left fitting hole 231 formed on a left side and circular first right fitting hole 232 formed on a right side. Fourth plate 240 extends upward from a front end of third plate 230 and has a horizontally long and narrow rectangular shape.

Connection terminals 250 are respectively formed at a position near a left end and a position slightly at a right side from a center in an upper end of fourth plate 240. Each of connection terminals 250 extends upward from the upper end of fourth plate 240, and then bends at a substantially right angle so as to extend forward. Further, connection terminal 250 bends at a substantially right angle so as to extend downward. Connection terminal 250 has round insertion hole 251.

As illustrated in FIGS. 4A and 4B, lower bus bar 300 is formed by a plate made of an electrically conductive material such as a copper plate, and includes first plate 310, second plate 320, third plate 330, fourth plate 340, and two connection terminals 350. Lower bus bar 300 is formed, for example, by appropriately cutting out and bending one copper plate. These first plate 310, second plate 320, third plate 330, fourth plate 340, and two connection terminals 350 are integrated.

First plate 310 has a horizontally long rectangular shape, covers end-face electrode 112 on the lower side of each of capacitor elements 110, and comes into contact with each of end-face electrodes 112. First plate 310 has a pair of electrode terminals 311 formed at a position corresponding to end-face electrode 112 of each of capacitor elements 110. Further, first plate 310 has two communication holes 312 formed on a left side and a right side, respectively. Filling resin 600 injected into case 500 flows through communication hole 312. Accordingly, resin 600 is easily filled up in a space between lower bus bar 300 and a bottom surface of case 500.

Second plate 320 extends upward from a front end of first plate 310 and has a horizontally long rectangular shape. Third plate 330 extends forward from an upper end of second plate 320 and has a horizontally long rectangular shape. Third plate 330 has circular second left fitting hole 331 formed on a left side and circular second right fitting hole 332 formed on a right side. Fourth plate 340 extends upward from a front end of third plate 330 and has a horizontally long and narrow rectangular shape.

Connection terminals 350 are respectively formed at a position near a right end and a position slightly at a left side from a center in an upper end of fourth plate 340. Each of connection terminals 350 extends upward from the upper end of fourth plate 340, and then bends at a substantially right angle so as to extend forward. Further, connection terminal 350 bends at a substantially right angle so as to extend downward. Connection terminal 350 has round insertion hole 351.

Figure 5A:
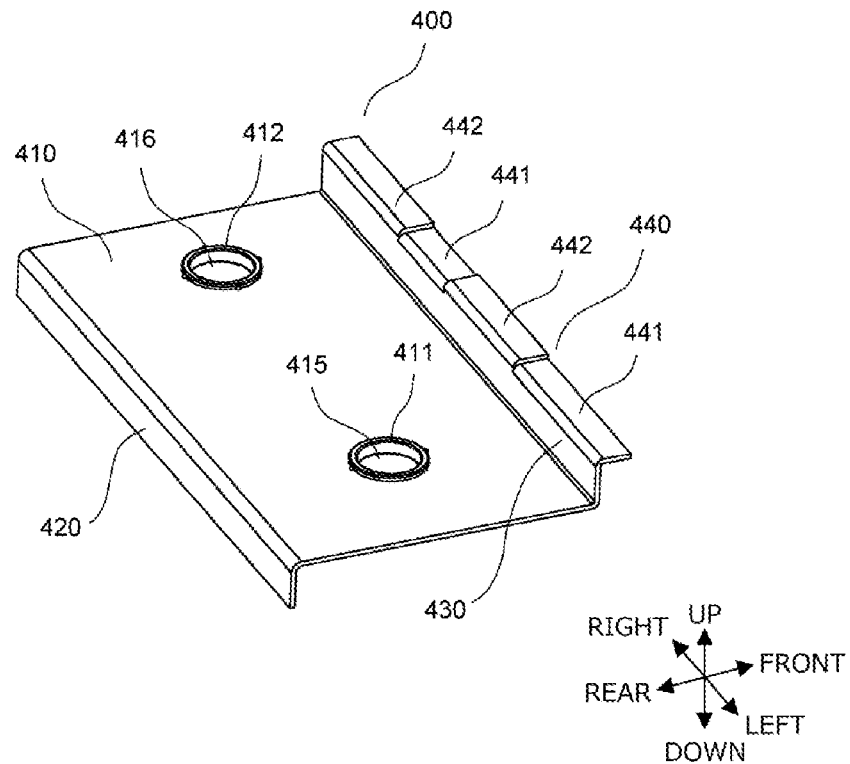
FIG. 5A is a rear perspective view illustrating an insulating plate according to the exemplary embodiment.
Figure 5B:
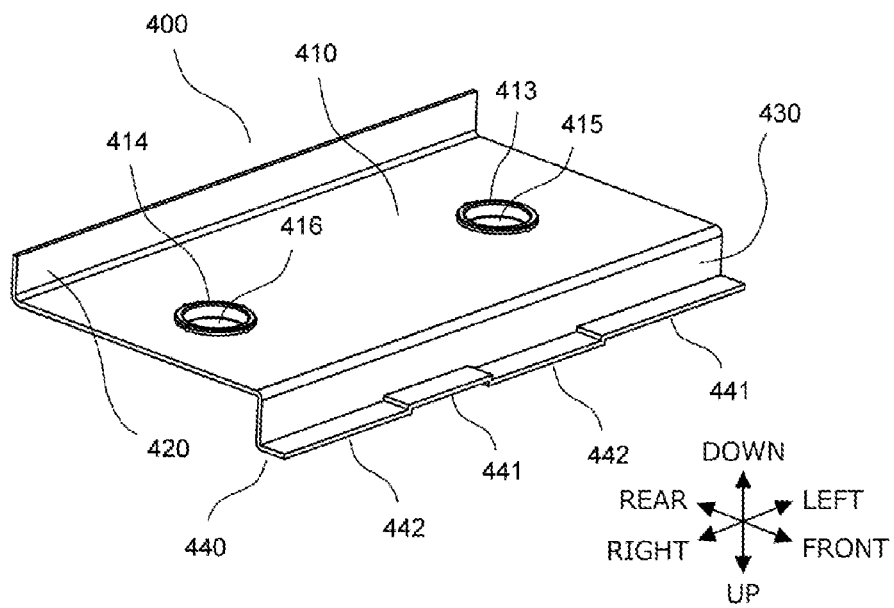
FIG. 5B is a front perspective view illustrating the insulating plate in a turned-over state according to the exemplary embodiment.

FIG. 5A is a rear perspective view illustrating insulating plate 400, and FIG. 5B is a front perspective view illustrating insulating plate 400 in a turned-over state.

Insulating plate 400 is sandwiched between upper bus bar 200 and lower bus bar 300. A width of insulating plate 400 in left to right direction is slightly greater than a width of each of upper bus bar 200 and lower bus bar 300 in left to right direction. Insulating plate 400 sandwiched between upper bus bar 200 and lower bus bar 300 slightly protrudes in the left to right direction.

Insulating plate 400 is made of an insulating material, for example, a resin such as a polyphenylene sulfide resin, and includes main plate 410, rear plate 420, first front plate 430, and second front plate 440.

Main plate 410 has a horizontally long rectangular shape. First left protrusion 411 and first right protrusion 412 respectively corresponding to first left fitting hole 231 and first right fitting hole 232 of upper bus bar 200 are formed on a front surface of main plate 410 (a surface that faces third plate 230). Further, on a back surface of main plate 410 (a surface that faces third plate 330), second left protrusion 413 corresponding to second left fitting hole 331 of lower bus bar 300 is formed at a position opposite to first left protrusion 411, and second right protrusion 414 corresponding to second right fitting hole 332 of lower bus bar 300 is formed at a position opposite to first right protrusion 412. Main plate 410 has circular left through-hole 415 and circular right through-hole 416. Circular right through-hole 416 penetrates through first left protrusion 411 and second left protrusion 413. And circular right through-hole 416 penetrates through first right protrusion 412 and second right protrusion 414. Since outside shape of each of first left protrusion 411 and second left protrusion 413 is circular and circular left through-hole 415 is formed inside them, each of first left protrusion 411 and second left protrusion 413 has an annular shape. Similarly, since outside shape of each of first right protrusion 412 and second right protrusion 414 is circular and circular right through-hole 416 is formed inside them, each of first right protrusion 412 and second right protrusion 414 has an annular shape.

Rear plate 420 extends downward from a rear end of main plate 410 and has a horizontally long and narrow rectangular shape. First front plate 430 extends upward from a front end of main plate 410 and has a horizontally long and narrow rectangular shape. Second front plate 440 extends forward from an upper end of first front plate 430 and has a horizontally long and narrow rectangular shape. Second front plate 440 alternately has lower parts 441 and higher parts 442 from a left end. Each of lower parts 441 has a lower height, and each of higher parts 442 has a higher height.

Figure 6A:
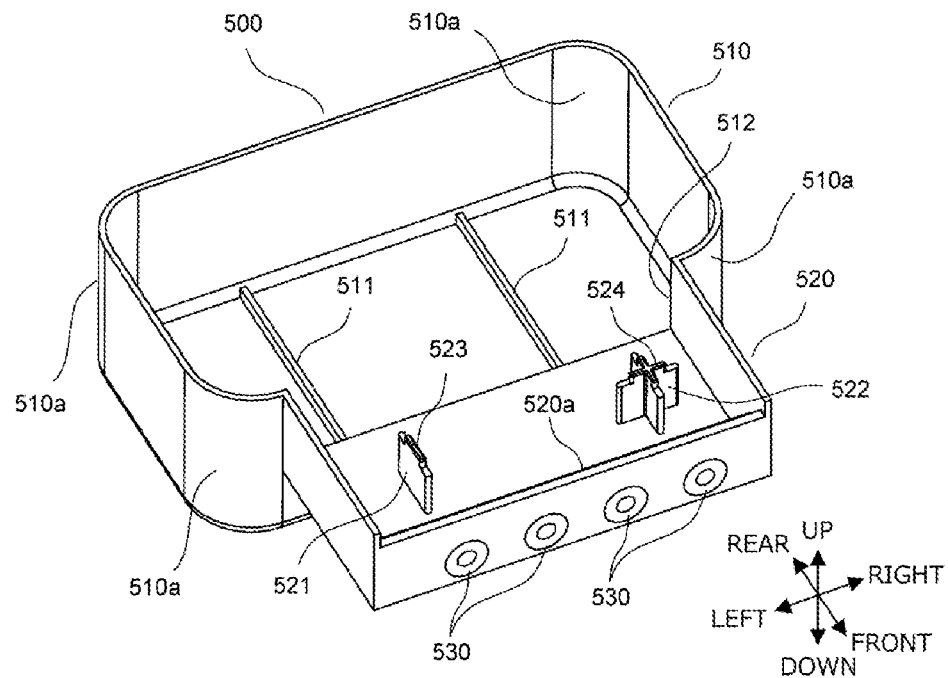
FIG. 6A is a front perspective view illustrating a case according to the exemplary embodiment.
Figure 6B:
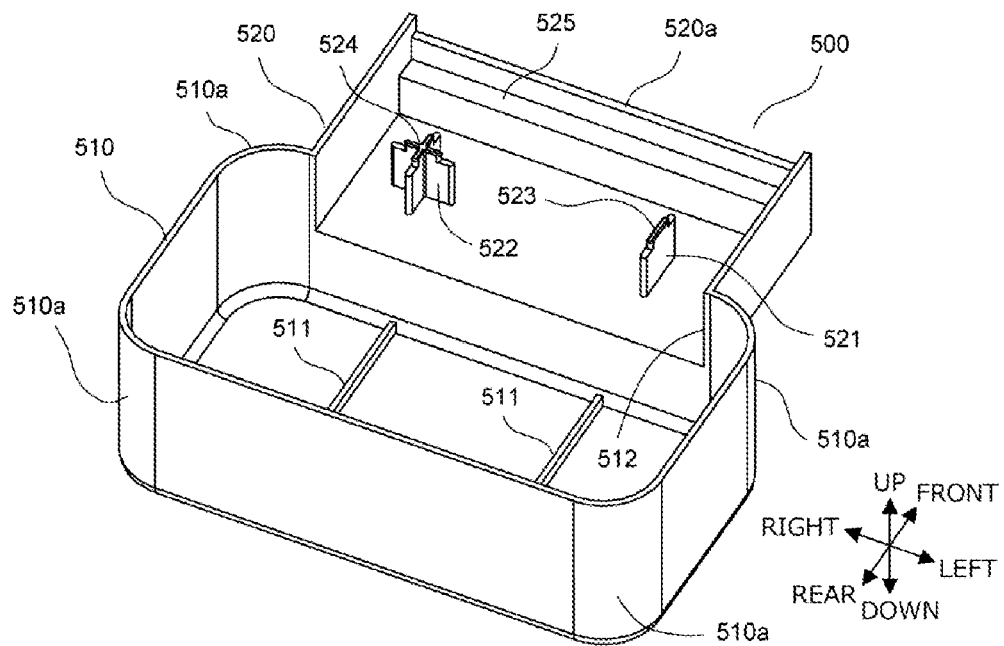
FIG. 6B is a rear perspective view illustrating the case according to the exemplary embodiment.

FIG. 6A is a front perspective view illustrating case 500, and FIG. 6B is a rear perspective view illustrating case 500.

Case 500 is made of a resin, such as a polyphenylene sulfide resin, and has an opened upper face. Herein, the resin for forming case 500 is same as the resin for forming insulating plate 400. Case 500 includes first case 510 in rear and second case 520 in front.

First case 510 has a substantially horizontally long rectangular parallelepiped shape. A large rounded part is formed at each of four corners 510a on a side surface of first case 510 so as to corresponding to a shape of capacitor group 100 to be housed. A plurality of support ribs 511 extending in the front to rear direction are formed on a bottom surface of first case 510. Support ribs 511 support, at a side near capacitor group 100, capacitor unit U housed in first case 510 such that a small gap can be formed between the bottom surface of first case 510 and lower bus bar 300.

Second case 520 is formed integrally with first case 510 in front of first case 510. Second case 520 has a substantially horizontally long rectangular parallelepiped shape. A size of second case 520 is smaller than a size of first case 510 in the up to down direction, front to rear direction, and left to right direction. Second case 520 communicates with first case 510 through opening 512 formed on a front surface of first case 510. A bottom surface of second case 520 is made one step higher than the bottom surface of first case 510. Further, upper end 520a on a front surface of second case 520 is made one step lower than peripheral upper ends.

In second case 520, left supporting part 521 and right supporting part 522 are respectively formed on a left side and a right side of the bottom surface. As viewed from above, left supporting part 521 has a shape like minus character and right supporting part 522 has a shape like plus character. A size of left supporting part 521 in front to rear direction is larger than an inner diameter of left through-hole 415 of insulating plate 400, and a size of right supporting part 522 in each of front to rear direction and left to right direction is larger than an inner diameter of right through-hole 416 of insulating plate 400.

On an upper end of left supporting part 521, left projecting part 523 having a shape of minus character the same as left supporting part 521 and slightly smaller than left supporting part 521 is formed. A size of left projecting part 523 in front to rear direction is substantially equal to the inner diameter of left through-hole 415 of insulating plate 400. Further, on an upper end of right supporting part 522, right projecting part 524 having a shape of plus character the same as right supporting part 522 and slightly smaller than right supporting part 522 is formed. A size of right projecting part 524 in each of front to rear direction and left to right direction is substantially equal to the inner diameter of right through-hole 416 of insulating plate 400. Furthermore, second case 520 has support face 525 formed by raising a front end of second case 520 by one step from the bottom surface.

On the front surface of second case 520, four nuts 530 each corresponding to two connection terminals 250 of upper bus bar 200 and two connection terminals 350 of lower bus bar 300 are integrally provided to second case 520 by insert molding.

Figure 7:
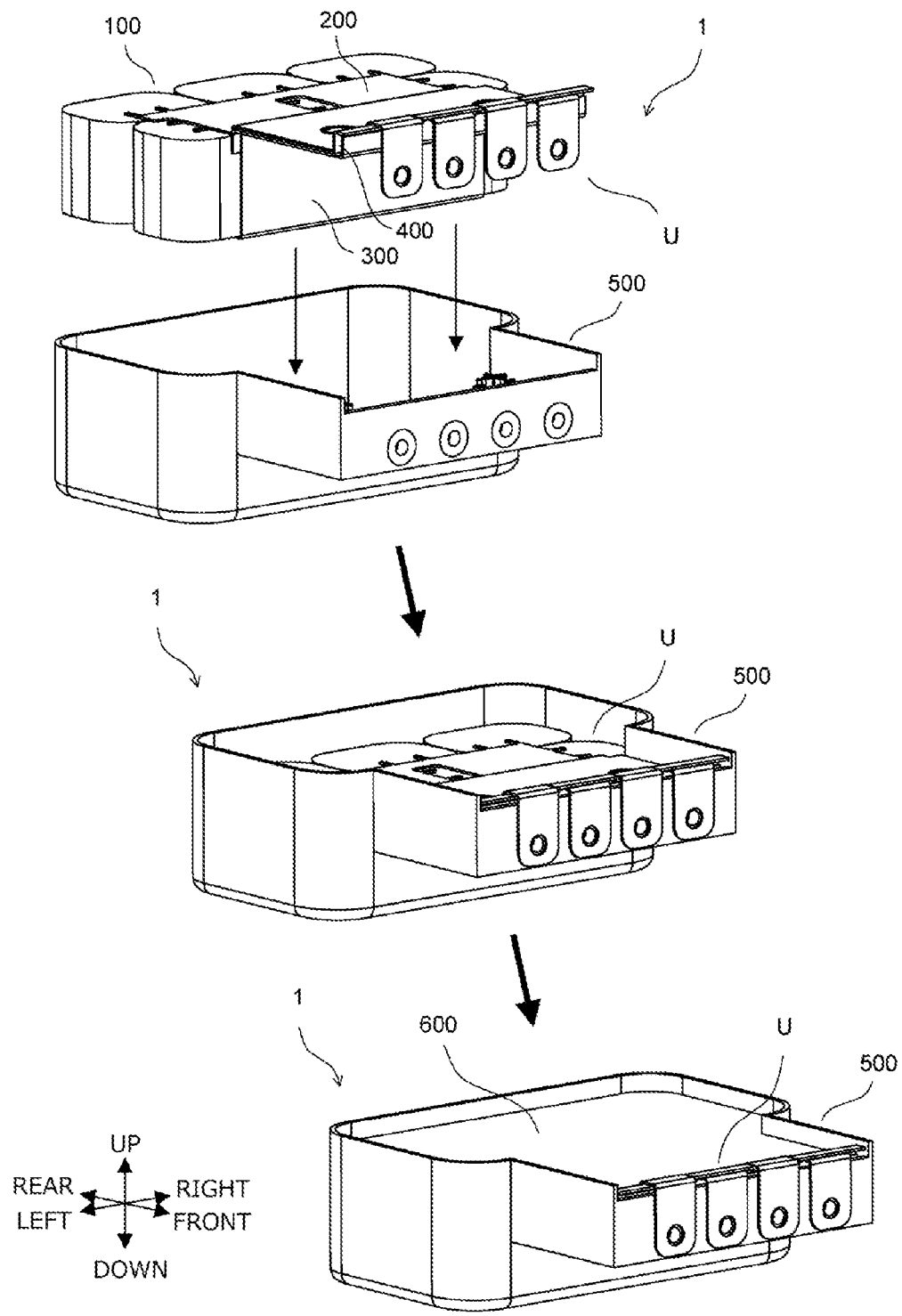
FIG. 7 is a view for explaining an assembly procedure of a capacitor unit according to the exemplary embodiment.

FIG. 7 is a view for explaining an assembly procedure of film capacitor 1.

First, capacitor unit U is assembled by using an assembly jig (not illustrated). In other words, lower bus bar 300 is placed within the assembly jig. Capacitor group 100 is placed above first plate 310 of lower bus bar 300. And insulating plate 400 is placed above third plate 330 of lower bus bar 300. Then, upper bus bar 200 is placed above capacitor group 100 and insulating plate 400. After capacitor group 100, upper bus bar 200, lower bus bar 300, and insulating plate 400 are placed within the assembly jig, each of the pair of electrode terminals 211 of upper bus bar 200 and end-face electrode 111 on the upper side of each of capacitor elements 110 are connected by a connecting process such as soldering. Simultaneously, each of the pair of electrode terminals 311 of lower bus bar 300 and end-face electrode 112 on the lower side of each of capacitor elements 110 are connected by the connecting process such as soldering. Capacitor unit U is completed in this way.

Next, completed capacitor unit U is housed in case 500 from above. Then, molten filling resin 600 is injected into case 500 in which capacitor unit U is housed. Case 500 is filled with filling resin 600 to a position in which capacitor unit U except four connection terminals 250, 350 is embedded. Then, when filling resin 600 within case 500 is cooled and solidified, film capacitor 1 is completed.

Figure 8A:
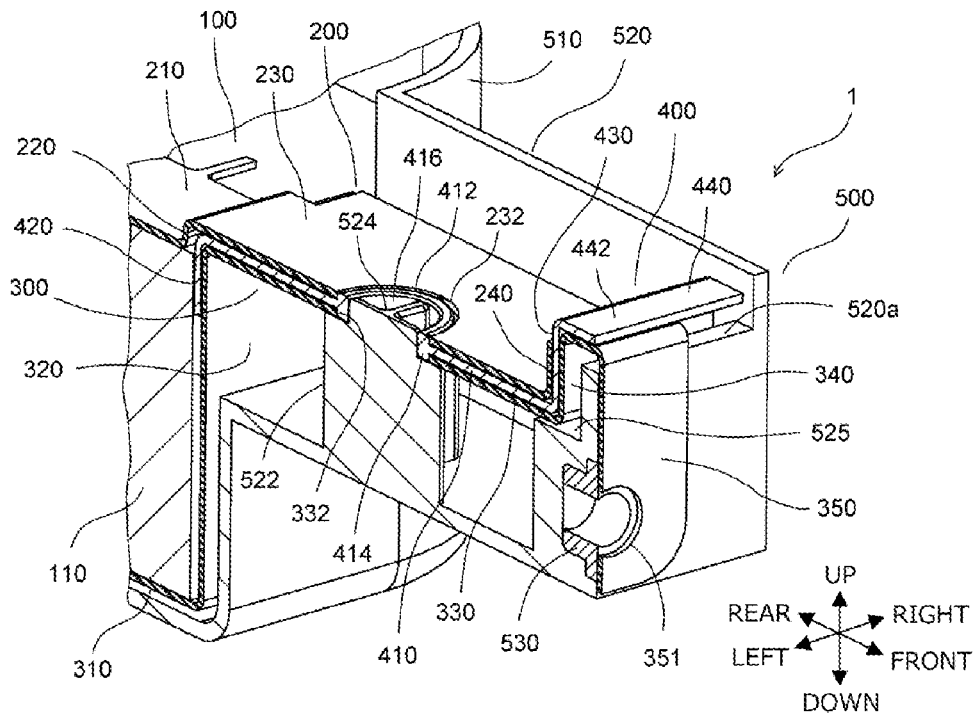
FIG. 8A is a sectional perspective view illustrating a main part of the film capacitor cut at a position of a right supporting part in a front to rear direction according to the exemplary embodiment.
Figure 8B:
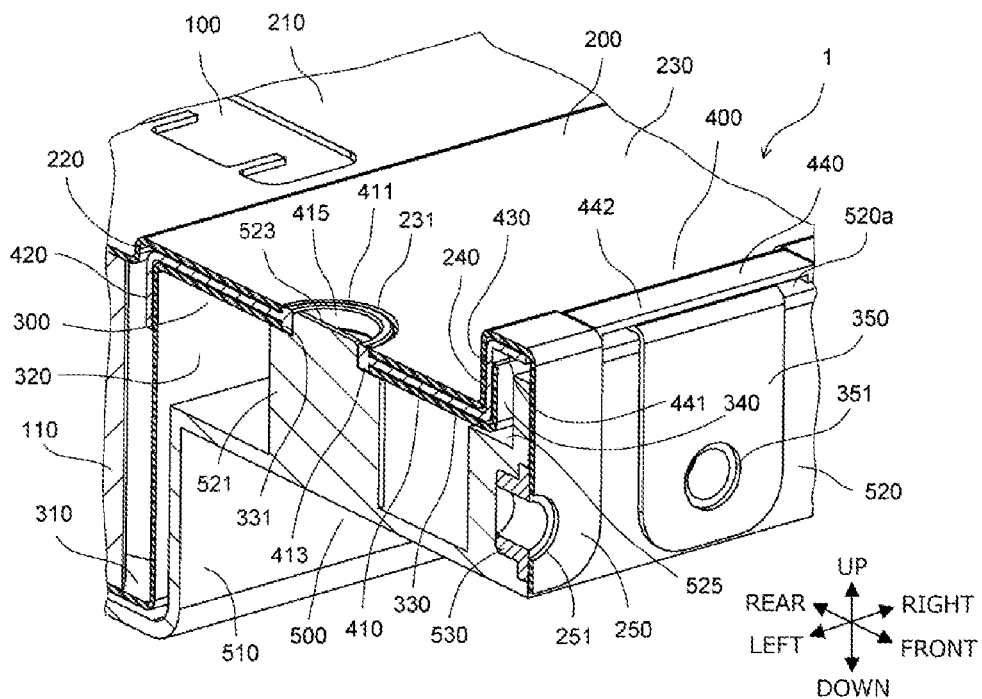
FIG. 8B is a sectional perspective view illustrating the main part of the film capacitor cut at a position of a left supporting part in the front to rear direction according to the exemplary embodiment.

FIG. 8A is a sectional perspective view illustrating a main part of film capacitor 1 cut at a position of right supporting part 522 in the front to rear direction. FIG. 8B is a sectional perspective view illustrating the main part of film capacitor 1 cut at a position of left supporting part 521 in the front to rear direction. Note that FIGS. 8A and 8B illustrate a state before case 500 is filled with filling resin 600.

In second case 520, third plate 230 and fourth plate 240 of upper bus bar 200 and third plate 330 and fourth plate 340 of lower bus bar 300 are overlapped via main plate 410 and first front plate 430 of insulating plate 400. With this configuration, equivalent series inductance (ESL) of upper bus bar 200 and lower bus bar 300 can be reduced.

Herein, first left protrusion 411 and first right protrusion 412 on the upper surface of insulating plate 400 (main plate 410) are respectively fitted into first left fitting hole 231 and first right fitting hole 232 of upper bus bar 200 (third plate 230). Further, second left protrusion 413 and second right protrusion 414 on the bottom surface of insulating plate 400 (main plate 410) are respectively fitted into second left fitting hole 331 and second right fitting hole 332 of lower bus bar 300 (third plate 330). With this configuration, upper bus bar 200 and lower bus bar 300 are fixed to insulating plate 400 in the front to rear direction and the left to right direction.

Third plate 230 of upper bus bar 200, third plate 330 of lower bus bar 300 and main plate 410 of insulating plate 400 are supported by left supporting part 521, right supporting part 522, and support face 525 from below. With this configuration, a space to be filled with filling resin 600 is formed between third plate 330 of lower bus bar 300 and the bottom surface of second case 520.

Left projecting part 523 provided at the upper end of left supporting part 521 is inserted into left through-hole 415 of insulating plate 400, and right projecting part 524 provided at the upper end of right supporting part 522 is inserted into right through-hole 416 of insulating plate 400. Left projecting part 523 and an inner wall surface of left through-hole 415 are engaged, and right projecting part 524 and an inner wall surface of right through-hole 416 are engaged. Accordingly, insulating plate 400 is fixed to case 500 in the front to rear direction and the left to right direction. Note that, as described above, the same resin is used for forming insulating plate 400 and case 500. Accordingly, even when insulating plate 400 and case 500 are expanded by heat received from outside or heat generated by capacitor unit U itself, there is a less possibility that insulating plate 400 or case 500 is broken due to a difference in thermal expansion because coefficients of thermal expansion of insulating plate 400 and case 500 are equal.

Herein, when left through-hole 415 is viewed from front (above), left projecting part 523 has a shape of minus character while left through-hole 415 has a circular shape. That is to say, shapes of left projecting part 523 and left through-hole 415 are different from each other. Accordingly, a gap is formed between left projecting part 523 and inner surface of left through-hole 415. Further, since left supporting part 521 has the shape of minus character as viewed from above, an entire region of left through-hole 415 is not covered with left supporting part 521 from below. In other words, left through-hole 415 is not entirely occluded with left supporting part 521. Thus, a gap is formed between left through-hole 415 and left supporting part 521. Similarly, when right through-hole 416 is viewed from front (above), right projecting part 524 has a shape of plus character while right through-hole 416 has a circular shape. That is to say, shapes of right projecting part 524 and right through-hole 416 are different from each other. Accordingly, a gap is formed between right projecting part 524 and inner surface of right through-hole 416. Further, since right supporting part 522 has the shape of plus character as viewed from above, an entire region of right through-hole 416 is not covered with right supporting part 522 from below. In other words, right through-hole 416 is not entirely occluded with right supporting part 522. Thus, a gap is formed between right through-hole 416 and right supporting part 522. With this configuration, when molten filling resin 600 is injected into case 500 from above, molten filling resin 600 flows into a space below overlapping upper and lower third plates 230, 330 through left through-hole 415 and right through-hole 416 to be stored in the space.

Connection terminal 250 of upper bus bar 200 and connection terminal 350 of lower bus bar 300 are extracted to a front side of second case 520 so as to climb over upper end 520a of the front surface of second case 520. And insertion hole 251 of connection terminal 250 and insertion hole 351 of connection terminals 350 are respectively matched with screw holes of nuts 530. Terminals of an external device (not illustrated) are connected to connection terminals 250, 350. At that time, fixing screws (not illustrated) are inserted into insertion holes 251, 351 to be fastened to nuts 530.

In second front plate 440 of insulating plate 400, higher part 442 is superposed on a connection terminal 350 of lower bus bar 300, and lower part 441 is interposed between the upper end of fourth plate 340 of lower bus bar 300 and connection terminal 250 of upper bus bar 200. A creepage distance between fourth plate 240 of upper bus bar 200 and connection terminal 350 of lower bus bar 300 is sufficiently secured by higher part 442, and a creepage distance between fourth plate 340 of lower bus bar 300 and connection terminal 250 of upper bus bar 200 is sufficiently secured by lower part 441. Further, rear plate 420 of insulating plate 400 is superposed on a rear side of an upper part of second plate 320 included in lower bus bar 300. With this configuration, a creepage distance between second plate 220 of upper bus bar 200 and second plate 320 of lower bus bar 300 is sufficiently secured. Furthermore, as described above, insulating plate 400 protrudes from upper bus bar 200 and lower bus bar 300 in the left to right direction. With this configuration, creepage distances between left and right ends of upper bus bar 200 and lower bus bar 300 are sufficiently secured.

Effects of Exemplary Embodiment

As described above, in accordance with the present exemplary embodiment, the following effects are exerted.

First left protrusion 411 and first right protrusion 412 of insulating plate 400 are respectively fitted into first left fitting hole 231 and first right fitting hole 232 of upper bus bar 200. Second left protrusion 413 and second right protrusion 414 on the back surface of insulating plate 400 are respectively fitted into second left fitting hole 331 and second right fitting hole 332 of lower bus bar 300. Accordingly, upper bus bar 200 and lower bus bar 300 can be fixed to insulating plate 400 in the front to rear direction and left to right direction. With this configuration, since position deviation between upper bus bar 200 and insulating plate 400 and between lower bus bar 300 and insulating plate 400 can be prevented, an appropriate creepage distance between upper bus bar 200 and lower bus bar 300 can be secured.

Further, insulating plate 400 is formed with left through-hole 415 penetrating first left protrusion 411 and second left protrusion 413 and right through-hole 416 penetrating first right protrusion 412 and second right protrusion 414. Accordingly, filling resin 600 injected into case 500 can be smoothly poured into the space below lower bus bar 300 through these through-holes 415, 416, and the space can be sufficiently filled with filling resin 600. Moreover, in upper bus bar 200 and lower bus bar 300, first left fitting hole 231, first right fitting hole 232, second left fitting hole 331, and second right fitting hole 332 formed for fixing to insulating plate 400 can be used as inflow ports for flowing filling resin 600.

Furthermore, left projecting part 523 and right projecting part 524 of case 500 respectively engaged with left through-hole 415 and right through-hole 416 of insulating plate 400 have the shapes (the minus character shape, the plus character shape) different from the shapes of left and right through-holes 415, 416. Accordingly, while gaps serving as inflow passages of filling resin 600 are secured in left and right through-holes 415, 416, insulating plate 400 can be fixed to case 500 in the front to rear direction and left to right direction by using left and right through-holes 415, 416.

Furthermore, since left and right supporting parts 521, 522 supporting upper bus bar 200 and lower bus bar 300 are provided below left and right through-holes 415, 416, the sufficient space can be secured below lower bus bar 300. By securing the sufficient space in this way, filling resin 600 can be smoothly and fully poured below lower bus bar 300. As a result, heat generated by third plate 230 of upper bus bar 200 and third plate 330 of lower bus bar 300 can be efficiently radiated to the outside via filling resin 600. If the sufficient space cannot be secured, filling resin 600 cannot be smoothly poured below lower bus bar 300, and air layer may be generated. When the air layer exists in this way, heat transfer to the outside is deteriorated, and the heat generated by third plate 230 of upper bus bar 200 and third plate 330 of lower bus bar 300 may be transferred toward capacitor group 100.

Further, left and right supporting parts 521, 522 supporting upper bus bar 200 and lower bus bar 300 have the shapes (the minus character shape, the plus character shape) that do not entirely occlude respective left and right through-holes 415, 416 from below. Accordingly, filling resin 600 flowing through left and right through-holes 415, 416 is hardly dammed by left and right supporting parts 521, 522, and smoothly flows into the space below lower bus bar 300.

Although the exemplary embodiment of the present disclosure has been described above, the present disclosure is not limited to the exemplary embodiment described above, and moreover, a variety of modifications can be applied to application examples according to the present disclosure besides the exemplary embodiment described above.

For example, in the above-described exemplary embodiment, first left fitting hole 231 and first right fitting hole 232 of upper bus bar 200, second left fitting hole 331 and second right fitting hole 332 of lower bus bar 300, and left through-hole 415 and right through-hole 416 of insulating plate 400 are formed into the circular shapes. However, the shapes of these parts are not limited to the circular shapes, and may be rectangular shapes, for example. In this case, first left protrusion 411, first right protrusion 412, second left protrusion 413, and second right protrusion 414 of insulating plate 400 each take a form of a rectangular frame shape.

Further, in the above-described exemplary embodiment, two fitting holes 231, 232 are formed on upper bus bar 200, two fitting holes 331, 332 are formed on lower bus bar 300, two protrusions 411, 412 are formed on the front surface of insulating plate 400, and two protrusions 413, 414 are formed on the back surface of insulating plate 400. However, a number of fitting holes and a number of protrusions are not limited to 2, and may be 1 or 3 or more.

Furthermore, in the above-described exemplary embodiment, left supporting part 521 and right supporting part 522, and left projecting part 523 and right projecting part 524 have shapes different from each other. However, left supporting part 521 and right supporting part 522, and left projecting part 523 and right projecting part 524 may have the same shape each other. For example, the two may have a minus character shape, or the two may have a plus character shape.

Furthermore, a number of capacitor elements 110 constituting capacitor group 100 can be changed as appropriate depending on required electrical capacity, without being limited to the number of the above-described exemplary embodiment. In other words, six capacitor elements 110 are disposed in the above-described exemplary embodiment. However, the number of capacitor elements 110 is not limited to six. The other number of capacitor elements 110 may be disposed including a case where only one capacitor element 110 is disposed.

In addition, the exemplary embodiment of the present disclosure can be modified in various ways as appropriate within the scope of the technical idea disclosed in the claims.

Note that in the description of the above-described exemplary embodiment, a term indicating a direction, such as "above" or "below", indicates a relative direction that only depends on a relative positional relation of constituent members, and does not indicate an absolute direction, such as a vertical direction or a horizontal direction.

The present disclosure is useful for film capacitors used for various electric components of electronic devices, electric devices, industrial devices, vehicles or the like.

What is claimed is:

1. A film capacitor comprising:
    a capacitor element;
    a first bus bar and a second bus bar which are configured to extract electricity from the capacitor element;
    a case in which the capacitor element, the first bus bar, and the second bus bar are housed; and
    a filling resin with which the case is filled, wherein:
    the first bus bar has a first overlapping part, and the second bus bar has a second overlapping part, the first overlapping part and the second overlapping part overlapping with each other via an insulating plate,
    the insulating plate has a first surface that faces the first overlapping part and a second surface that faces the second overlapping part, and has a first protrusion formed on the first surface and a second protrusion formed on the second surface, the second protrusion opposing the first protrusion,
    the first overlapping part has a first fitting hole into which the first protrusion is fitted, and the second overlapping part has a second fitting hole into which the second protrusion is fitted,
    the insulating plate has a through-hole that penetrates through the first protrusion and the second protrusion, and
    the case has a fixing part configured to fix the insulating plate with respect to the case, the fixing part being inserted into the through-hole.

2. The film capacitor according to claim 1, wherein:
    the fixing part is configured to fix the insulating plate so that the insulating plate is disposed in parallel to a bottom surface of the case, and
    a gap for passing the filling resin is formed between the fixing part and an inner surface of the through-hole by making a shape of the fixing part and a shape of the through-hole different from each other when viewed from a direction perpendicular to the bottom surface of the case.

3. The film capacitor according to claim 1, wherein:
    the case further has a supporting part configured to support the first overlapping part and the second overlapping part, and the fixing part is disposed at an upper end of the supporting part.

4. The film capacitor according to claim 3, wherein the supporting part has a shape that do not entirely occlude the through-hole.

* * * * *